J. BUTTNER.
SAFETY STEERING DEVICE FOR MOTOR VEHICLES.
APPLICATION FILED SEPT. 16, 1919.
1,331,801. Patented Feb. 24, 1920.
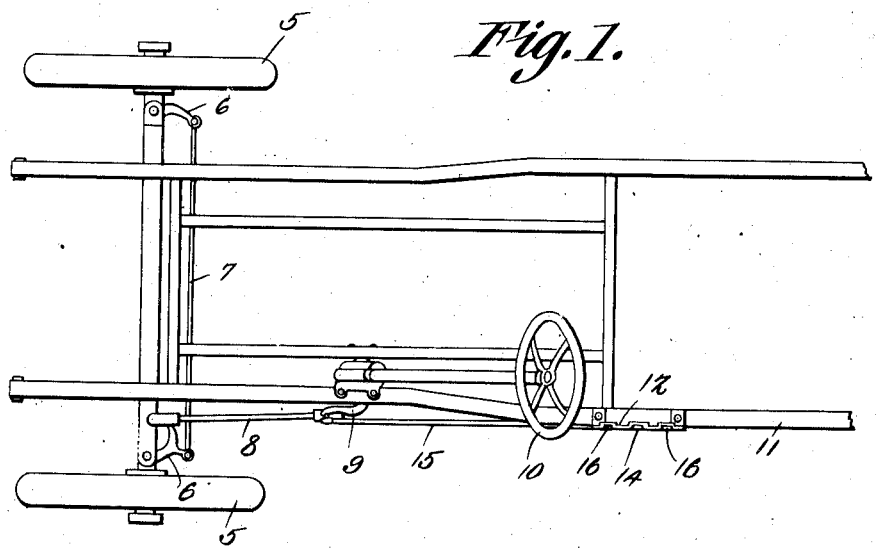
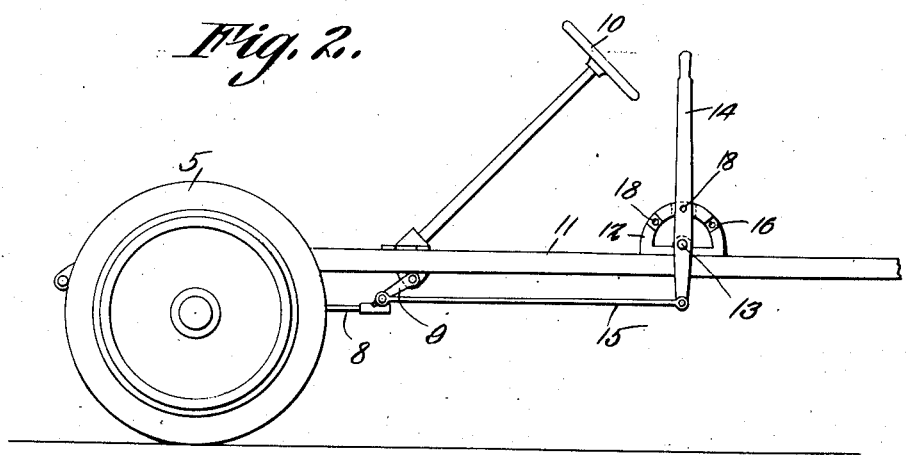
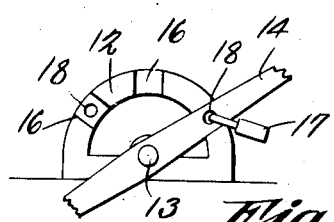
Inventor
Joseph Buttner,
By Henry P. Brevington,
Attorney

UNITED STATES PATENT OFFICE.

JOSEPH BUTTNER, OF BALTIMORE, MARYLAND.

SAFETY STEERING DEVICE FOR MOTOR-VEHICLES.

1,331,801.  Specification of Letters Patent.  Patented Feb. 24, 1920.

Application filed September 16, 1919. Serial No. 324,112.

*To all whom it may concern:*

Be it known that I, JOSEPH BUTTNER, a citizen of the United States, residing at Baltimore city, State of Maryland, have invented certain new and useful Improvements in Safety Steering Devices for Motor-Vehicles, of which the following is a specification.

The device which is the subject matter of the present application for patent is in the nature of an attachment applicable to the steering gear of motor vehicles, and having for its object to hold the wheels set for going straight ahead, so that the car will not deviate from its course in the event of a tire "blow-out," or if any of the wheels should strike a stone or other obstruction.

The invention also has for its object to provide an attachment of the kind stated which can be used for locking the steering gear to prevent theft or unauthorized use of the car, and which can also be used to steer the car if the regular steering gear should happen to get out of order.

With the objects stated in view, the invention consists in a novel combination and arrangement of parts to be hereinafter described and claimed, and in order that the same may be better understood, reference is had to the accompanying drawing forming a part of this specification.

Figure 1 is a plan view showing the application of the invention;

Fig. 2 is a side elevation thereof, and

Fig. 3 is a side elevation showing the means for enabling the invention to be used as a positive steering-gear lock.

Referring specifically to the drawing, the same shows only so much of the frame of a motor vehicle as will suffice to make clear the connection of the invention therewith. The front wheels of the car are shown at 5 and the steering spindle arms at 6, the latter being connected by a rod 7 as usual, by which the two wheels are swung simultaneously. One of the spindle arms 6 has a connection with a reciprocatory steering rod 8, which latter is connected to a crank arm 9 operated by a drive gearing which is actuated by the steering wheel 10, said gearing not being illustrated as it is well known and forms no part of the present invention. When the steering wheel 10 is operated, the crank arm 9 swings and moves the rod 8 in the direction of its length, and as said rod is connected to one of the arms 6, the wheels 5 are shifted to change the direction of the car.

On one of the longitudinal frame members 11 of the car is mounted a sector 12 to which is fulcrumed, as shown at 13, a vertically positioned hand lever 14 having its lower end connected by a link or rod 15 to the crank arm 9. The sector 12 has three locking notches 16 for the hand-lever 14, one of the notches holding the lever in upright position, and the other notches holding it when swung forwardly or rearwardly.

The connections between the steering gear and the hand lever 14 are such that when the wheels 5 are set for straight ahead travel of the car, the hand lever is seating in the center notch 16. As the hand lever is now locked the steering gear cannot move to change the direction of the car and it is held on its straight ahead course, and it will not deviate from this course if a tire should blow out, or if any of the wheels should meet a rock or other obstruction which ordinarily would throw the car out of its course. When the driver wishes to change the direction of the car, the lever 14 must first be released, and this can be easily done as it is conveniently located adjacent to the steering wheel 10. A slight lateral motion of the arm suffices to release the hand lever.

When the device is to be used for positively locking the steering gear to prevent theft or unauthorized use of the car, the steering gear is first operated to set the wheel 5 in a position to make a short turn. This brings the hand lever 14 opposite the front or rear recess 16, and by locking the lever in said recess, it will be obvious that the car cannot be driven as it cannot go straight ahead. For thus locking the hand lever, a padlock 17 may be used, the lever and the sector 12 having apertures 18 adapted to register to receive the shackle of the lock as shown in Fig. 3.

I claim:

1. The combination with the steering gear of a vehicle, said gear including a swinging member; of a hand lever pivotally mounted on the vehicle, a connection between the swinging member and the hand lever, and means for locking the hand lever.

2. The combination with the steering gear of a vehicle, said gear including a swinging member; of a hand lever pivotally mounted on the vehicle, a connection between the swinging member and the hand lever, and means for preventing movement of the hand lever.

3. The combination with the straight gear of a vehicle, said gear including a swinging member; of a hand lever pivotally mounted on the vehicle, a connection between the swinging member and the hand lever, and a sector having locking notches for the lever.

4. The combination with the steering gear of a vehicle, said gear including a swinging member; of a hand lever pivotally mounted on the vehicle, a connection between the swinging member and the hand lever, and a lock applicable to the hand lever for preventing movement thereof.

In testimony whereof I affix my signature in the presence of two witnesses.

JOSEPH BUTTNER.

Witnesses:
E. WALTON BREWINGTON,
HOWARD D. ADAMS.